United States Patent [19]

Tahara et al.

[11] Patent Number: 5,635,259
[45] Date of Patent: Jun. 3, 1997

[54] RESIN COMPOSITION FOR SEALING FILM-MADE LIQUID CRYSTAL CELLS

[75] Inventors: Syuji Tahara, Ichihara; Koichi Machida, Mobara; Seiji Itami, Chiba; Masayuki Horiuchi, Mobara, all of Japan

[73] Assignee: Mitsui Toatsu Chemicals, Inc., Tokyo, Japan

[21] Appl. No.: 487,889

[22] Filed: Jun. 7, 1995

Related U.S. Application Data

[62] Division of Ser. No. 264,938, Jun. 24, 1994, abandoned.

[30] Foreign Application Priority Data

Jun. 29, 1993 [JP] Japan .......................... 5-159288

[51] Int. Cl.$^6$ .................. C08L 63/10; C09K 19/00
[52] U.S. Cl. .................. 428/1; 428/413; 428/417; 523/400; 349/153
[58] Field of Search .................. 428/1, 413, 447; 523/540, 400, 453, 461; 359/80

[56] References Cited

U.S. PATENT DOCUMENTS

| | | |
|---|---|---|
| 3,856,933 | 12/1974 | Jankowiak et al. . |
| 4,362,903 | 12/1982 | Eichelberger et al. . |
| 4,524,181 | 6/1985 | Adam et al. . |
| 4,692,500 | 9/1987 | Hefner, Jr. . |
| 4,788,233 | 11/1988 | Sakakibara et al. . |
| 4,816,546 | 3/1989 | Hefner, Jr. et al. . |
| 5,150,239 | 9/1992 | Watanabe et al. . |
| 5,318,851 | 6/1994 | Baron et al. . |

FOREIGN PATENT DOCUMENTS

| | | |
|---|---|---|
| 013875 | 8/1980 | European Pat. Off. . |
| 55-16053 | 2/1980 | Japan . |
| 55-21432 | 2/1980 | Japan . |
| 57-23669 | 2/1982 | Japan . |
| 60-69634 | 4/1985 | Japan . |
| 60-72957 | 4/1985 | Japan . |
| 1-129232 | 5/1989 | Japan . |
| 3-170523 | 7/1991 | Japan . |

OTHER PUBLICATIONS

Handbook of Epoxy Resins, Lee et al, 1967, McGraw–Hill Book Company.
Database WPI, Derwent Publications Ltd., AN 84–216318, Jul. 1984.
Patent Abstracts of Japan, vol. 13, No. 115 (C–578), Mar. 1989.
Database WPI, Derwent Publications Ltd., AN 93–191679, May 1993.
Database WPI, Derwent Publications, Ltd., An 82–82861E, Aug. 1982.

*Primary Examiner*—Helen Lee
*Attorney, Agent, or Firm*—Burns, Doane, Swecker & Mathis

[57] ABSTRACT

A resin composition for sealing liquid crystal cells comprising as principal ingredients epoxy resin containing a polysulfide modified epoxy resin, hydrazide compounds and fillers.

The said epoxy resin contains a polysulfide modified epoxy resin expressed by the general formula (1) in an amount of 20 to 100% by weight in the entire epoxy resin and the average molecular weight of the entire epoxy resin is between 300 and 3000. Formula (1) is defined as follows:

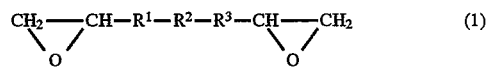

where each of $R^1$ and $R^3$ represents at least one organic group selected from a group consisting of bisphenol structures, aliphatic oxyether structures and aliphatic thioether structures and $R^2$ represents a polysulfide structure expressed by $-(C_2H_4OCH_2OC_2H_4S_m)_n-$, wherein m represents the number of sulfur atoms contained in a polysulfide structure, which is 1 or 2, and n represents the average number of polysulfide structures contained in the above formula, which is between 1 and 50.

A film-made liquid crystal cell made by using the resin composition is excellent in adhesion, flexibility, electric properties and has high reliability.

8 Claims, No Drawings

RESIN COMPOSITION FOR SEALING FILM-MADE LIQUID CRYSTAL CELLS

This application is a divisional of application Ser. No. 08/264,938, filed Jun. 24, 1994, now abandoned.

BACKGROUND OF THE INVENTION

1. Field of the Invention

This invention relates to a novel resin composition to be suitably used for sealing liquid crystal displays of a variety of types developed in recent years and to be reliably operated in severe environments. It also relates to a film-made liquid crystal cell realized by using such a resin composition.

In recent years, liquid crystal displays have become markedly popular in response to the rapid development of down-sized personal computers, audio equipment, instruments, color television sets and other electronic appliances. A liquid crystal display consumes less energy and requires less drive force than a cathode ray tube (CRT) so that it enables reductions of size, weight and cost, while producing clear and sharp images better than a CRT even in the sunlight. Because of these advantages, the scope of application of liquid crystal display (hereinafter referred to as LCD) has been constantly expanding. Particularly, tremendous efforts have been made to develop LCDs comprising a film substrate that are thin and lightweight and not damaged even if carried in a pocket of a jacket. As known glass-made LCDs, film-made LCDs are required to have outstanding physical properties. For instance, the components of the cell of the LCD need to be firmly bonded together to provide an enhanced degree of hermeticity. Therefore, they must be physically and chemically stable and resistant against moisture and heat.

2. Description of the Prior Art

Currently, a cell comprising glass substrates and liquid crystal is prepared typically by bonding upper and lower substrates by means of a one-liquid hot-cure type epoxy adhesive, injecting liquid crystal in a highly vacuum condition and sealing the remaining hole by means of a UV (ultraviolet)-light-cure type or two-liquid cold-cure type resin. Improved and highly efficient one-liquid hot-cure type adhesives are currently available and, therefore, there are practically no technological troubles for bonding glass substrates.

On the other hand, one-liquid hot-cure type or two-liquid type epoxy adhesive are used for bonding film substrates. However, a one-liquid hot-cure type epoxy adhesive is originally designed to bond glass substrates and, once cured, it becomes so hard that it is scarcely capable of withstanding bending force and adapting itself to thermal deformations of the bonded substrates and it is rather poorly adherent to the substrates. A two-liquid type epoxy adhesive is disadvantageous in that it has a relatively short pot life and does not have satisfactory physical and chemical stability to the moisture and the heat of the prepared cell. Sealing materials containing flexible epoxy resin as a principal ingredient such as a polyol type epoxy resin or a urethane type epoxy resin, have been studied, although such materials are not particularly adherent to film and, to some extent, lack physical and chemical stability to the moisture and the heat of the cells prepared by using such materials. Thus, no satisfactory adhesive has been developed so far for film substrates.

A number of adhesives have been proposed for sealing film-made liquid crystal cells, including one using thermoplastic resin varnish for dissolving the surface of substrates and bonding them by applying heat and pressure thereto (Japanese Patent Application Laid-open No. Shou 57-23669), one using a double bonding technique, where substrates are bonded together by means of a silicone resin type substance on the inside and an epoxy resin type substance on the outside (Japanese Patent Application Laid-open No. Shou 60-69634) and one that cures with heat and light (Japanese Patent Application Laid-open No. Hei 1-129232). None of these, however, has been found commercially feasible.

SUMMARY OF THE INVENTION

In view of the above described circumstances, it is therefore an object of the present invention to provide a resin composition for sealing liquid crystal cells that is easy to use, highly adhesive to film substrates and flexible so that it may be adapted to thermal deformations of the substrates, while physically and chemically stable to the moisture and the heat of the substrates.

Another object of the present invention is to provide a film-made liquid crystal cell used the resin composition.

As a result of intensive research efforts of the inventors of the present invention, the above object and other objects of the invention are achieved by providing a resin composition comprising epoxy resin that contains a polysulfide modified epoxy resin having a polysulfide structure where a plurality of sulfur atoms are directly linked to chain units in a molecule and an epoxy group is present at each end of the molecule.

DESCRIPTION OF THE PREFERRED EMBODIMENTS

A resin composition according to the present invention comprises as principal ingredients epoxy resin containing a polysulfide modified epoxy resin, at least one of hydrazide compounds and at least one of fillers, to which rubber may be added to improve the bond strength and the flexibility of the composition by relieving the stress generated in it when it is cured along with a cure accelerator that reduces the time required for curing at low temperature.

Now, the specific formulations of the resin composition according to the invention will be described below.

Preferably, the epoxy resin to be used for the purpose of the invention contains a polysulfide modified epoxy resin expressed by general formula (1)

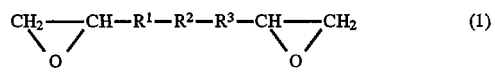

(where each of $R^1$ and $R^3$ represents at least one organic group selected from a group consisting of bisphenol structures, aliphatic oxyether structures and aliphatic thioether structures and $R^2$ represents a polysulfide structure expressed by $-(C_2H_4OCH_2OC_2H_4S_m)_n-$, wherein m represents the average number of sulfur atoms contained in a polysulfide structure, which is 1 or 2, and n represents the average number of polysulfide structures contained in the above formula, which is between 1 and 50) by 20 to 100% by weight, preferably 50 to 95% by weight, and two or more than two epoxy groups in a molecule, and the average molecular weight of the entire epoxy resin is preferably between 300 and 3,000.

Organic groups selected from a group of bisphenol structures for $R^1$ and $R^3$ in formula (1) may include, but are not limited to, bisphenol A, bisphenol F, bisphenol AD, bisphenol S as well as alkylated, allylated, acylated and halogenated compounds of them. If the organic groups represented by $R^1$ and $R^3$ do not comprise a bisphenol structure, they comprise either an aliphatic oxyether structure or an aliphatic thioether structure.

Additionally, a polysulfide modified epoxy resin to be preferably used for the purpose of the present invention is a disulfide having epoxy groups at the ends and expressed by general formula (2)

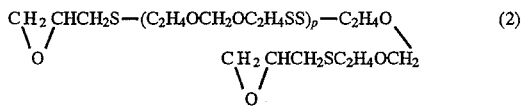
(2)

wherein p represents the average number of disulfide structures comprised in a molecule, which is between 1 and 15.

Examples of polysulfide modified epoxy resin expressed by general formula (1) above include, if m=2, FLEP-10, FLEP-50, FLEP-60 and FLEP-80 (tradenames: all available from Toray Thiokol Co., Ltd.)

Epoxy resins other than polysulfide modified epoxy resins that can be used for the purpose of the present invention include:

(1) polycondensation resins obtained through polycondensation of a compound selected from groups consisting of <1> bisphenols such as bisphenol A and bisphenol F, <2> novolak resin obtained by addition condensation of phenol or cresol and formaldehyde, <3> hydroxy compounds such as tetrahydroxyphenyl methane and resorcinol, <4> amines such as diaminodiphenyl methane, aniline and xylilenediamine, <5> polyhydric alcohols such as glycerol and pentaerythritol, <6> carboxy compounds such as phthalic acid and hexahydrophthalic acid and <7> polyalkylene ethers such as ethyleneglycol and its polymers and propyleneglycol and its polymers, and an epihalohydrin such as epichlorohydrin or epibromohydrin and resins obtained through halogenation of such polycondensation resins as well as polycondensation resins obtained through polycondensation of a compound selected from the groups <1> through <7> above and a methylepihalohydrin such as methylepichlorohydrin and resins obtained through halogenation of such polycondensation resins, (2) epoxidated aliphatic acids such as epoxidated soy bean oil and its derivatives, (3) epoxidated diene polymers such as epoxidated polybutadiene and epoxidated polyisoprene, (4) aliphatic epoxy resins such as 3,4-epoxy-6-methylcyclohexylmethyl-3,4-epoxy-6-methylcyclohexane carbonate and bis(2,3-epoxycyclopentyl)ether and (5) epoxy resins made flexible through addition of methylene bis(4-phenylisocyanate), tolylenediisocyanate, hexamethylenediisocyanate or isophoronediisocyanate.

Any of these resins may be used alone or in combination with at least one of the remaining candidate resins.

When the polysulfide modified epoxy resin occupies less than 20% by weight of the total weight of the entire epoxy resin contained in a composition according to the invention, the cured product to be obtained will be too hard or, if not too hard, poorly adherent to film substrates with markedly reduced physical and chemical stability.

The reason why the average molecular weight of the entire epoxy resin is preferably held between 300 and 3,000 is that, if it is below 300, the cured product to be obtained will be too hard and poorly adhesive to the components of the cell to acquire a desired level of physical and chemical stability.

If, on the other hand, the average molecular weight of the entire epoxy resin exceeds 3,000, it will become poorly resistive to heat and will lose any physical and chemical stability. Preferably, the average molecular weight of the epoxy resin is between 700 and 2,000.

For the purpose of the present invention, at least one of hydrazide compounds may be selected for use from (1) monobasic acid hydrazide compounds such as salicylic acid hydrazide, p-oxybenzoic acid hydrazide, phenylaminopropionic acid hydrazide, lauric acid hydrazide and the like, (2) dibasic acid hydrazide compounds such as succinic acid dihydrazide, adipic acid dihydrazide, isophthalic acid dihydrazide, dodecanoic diacid dihydrazide, carbohydrazide, sebacic acid dihydrazide, thiodipropionic acid dihydrazide, furandicarbonic acid dihydrazide, cyclohexanedicarbonic acid dihydrazide and the like. Of these, dibasic acid hydrazide compounds are particularly suited for the present invention.

Any of these hydrazide compounds will work as a curing agent for epoxy resin and, when mixed with epoxy resin, the mixture serves as a one-liquid type epoxy adhesive because it can be stably stored at room temperature. Nevertheless, these hydrazide compounds can start curing a one-liquid type epoxy adhesive at lower temperature and show a better resistivity against heat, cold and moisture than any other curing agents that are conventionally used for a one-liquid type epoxy adhesive such as dicyanodiamide and boron trifluoride. At least one of these hydrazide compounds are preferably used at a ratio of 1/3 to 2/3 mols of hydrazide group to a mol of epoxy group of the epoxy resin contained in the agent. For mixing the two ingredients, a triple-roll mixer may preferably be used for kneading the mixture in order to evenly and finely disperse the hydrazide compound or compounds that are normally solid.

Fillers that can be used for the purpose of the present invention include (1) inorganic fillers including carbonates such as calcium carbonate and magnesium carbonate, sulfates such as barium sulfate, magnesium sulfate, silicates such as aluminum silicate and zirconium silicate, oxides such as iron oxide, titanium oxide, aluminum oxide (alumina), silicon oxide (silica) and zinc oxide, and kaolin, talc, asbestos powder, quartz powder, mica and glass fiber and the like (2) organic fillers such as polyethylene powder, polypropylene powder, polyvinylchloride powder, polystyrene powder, polyvinylacetate powder, polystyrene-polyvinylacetate-copolymer powder, polymethacrylate powder, polyurethane powder, polyester powder, urea resin powder, phenol resin powder, epoxy resin powder and the like. For the purpose of the invention, at least one of these fillers may be selected for use.

While the rate at which at least one of the above listed fillers are added varies depending on the chemical constitution of the resin composition to be prepared and the type of the fillers to be used, typically they are used at a ratio of 1 to 100 portions by weight to 100 portions by weight of the entire epoxy resin. If the fillers are below 1 weight portion, the prepared product would not be smoothly applied and, if applied, the screen-printed patterns would not always be desirable and become inoperative. If, on the other hand, it exceeds 100 weight portions, applying by means of screen-printing can be obstructed. For mixing fillers with a mixture of epoxy resin and at least one of the hydrazide compounds, a triple-roll mixer may preferably be used for kneading the mixture and pulverizing the fillers to fine particles in order to avoid clogging a the screen at the time of screen-printing operation.

Any rubber that can be graft-copolymerized with epoxy resin of the above identified type so that rubber particles are dispersed in the resin layer formed and can have a so-called sea/islands structure when a resin composition for sealing liquid crystal cells according to the invention is cured may be suitably used for the purpose of the invention.

For the purpose of the present invention, rubber particles may be dispersed into the epoxy resin or, alternatively, they may be dissolved into the epoxy resin and thereafter deposited when the latter is cured. Still alternatively, rubber particles may be produced in the presence of a graft-copolymer or a copolymer of epoxy resin. Preferably, particles are produced in the presence of a graft-copolymer or a copolymer of the epoxy resin because the particle size of rubber particles can be controlled with such a technique. However, any of these techniques can disperse rubber particles in a stable manner as they cause rubber and epoxy resin to interact with each other at the interface. If rubber and epoxy resin do not interact at the interface, the former is apt to agglomerate after having been cured and can damage the reliability of the product. If, on the other hand, the rubber is appropriately cross-linked, the rubber particles are highly resistive against deformation that may be caused by the curing stress.

Rubber to be suitably used for the purpose of the invention is preferably of acrylester, silicone, conjugated diene, olefin, polyester or urethane type and more preferably of acrylester, silicone or conjugated diene type. Rubber of any of these types may be used alone or in combination with rubber of any other type.

Acrylester type rubber is used for the purpose of the invention in the form of particles that can be prepared by drying a core/shell emulsion of the rubber or by means of a method of manufacturing an acrylic acid ester polymer as disclosed in Japanese Patent Application Laid-open No. 55-16053 or a method of manufacturing a graft-copolymer of thermosetting resin and a vinyl polymer as disclosed in Japanese Patent Application Laid-open No. 55-21432, of which the latter method is preferable in terms of dispersion technique and the viscosity after dispersion.

Methods that can be used to prepare silicone type rubber for the purpose of the invention include those utilizing fine particles of silicone rubber (Japanese Patent Applications Laid-open Nos. 60-72957 and Hei 3-170523). According to one of the methods, double bonds are formed in epoxy resin and the epoxy resin is caused to react with silicone containing active hydrogen atoms capable of reacting with double bonds to form a graft-polymer, and then in the presence of the graft-polymer silicone monomers are polymerized. Whereas, with the other method, double bonds are formed in epoxy resin which is caused to react with silicone monomers having vinyl groups that are active for polymerization to produce a graft-polymer, and then in the presence of the graft-polymer silicone rubber monomers are polymerized. However, methods that produce grafted products without utilizing fine silicone rubber particles and prepare rubber particles after the production of grafted products are preferable because such methods can control the size of rubber particles and prevent any undesired increase in the viscosity of the product obtained after dispersing fine particles. Thus, such methods are advantageous for screen-printing a resin composition according to the invention. With these methods, rubber particles and epoxy resin interact with each other at the interface thereof to disperse the former in a well stabilized manner. If, to the contrary, rubber particles and epoxy resin do not interact with each other at the interface thereof, the former is apt to agglomerate after having been cured and to damage the reliability of the product. Additionally, it is desired to be selective in the use of monomers because rubber particles are highly resistive against deformation that may be caused by the curing stress if the rubber is appropriately gelled. The above description also holds true for acryl ester type rubber and, therefore, it is preferable to use monomers having glycidyl groups or polyvinyl groups to an appropriate proportion.

Conjugated diene type rubber may be produced through polymerization or copolymerization of monomers of 1,3-butadiene, 1,3-pentadiene, isoprene, 1,3-hexadiene or chloroprene. Rubber articles of this type are also commercially available. A copolymer of butadiene and acrylonitrile which has carboxyl groups or amino groups at the ends of the molecule is particularly advantageous in that it can dissolve in epoxy resin and rubber is deposited at the time of curing so that particles of the produced rubber can be held under control. However, it should be noted that it is difficult to control the particle size of the produced rubber with this technique when compared with the two methods described above (using acryl ester type rubber and silicone type rubber) and the obtained product may be short of satisfactory performance.

For the purpose of the present invention, rubber particles preferably have an average diameter between 0.01 and 5 μm, more preferably between 0.01 and 2 μm and are dispersed throughout the product to form a so-called sea/islands structure. If the average particle size is out of the above defined range, the obtained product may be short of reliability and satisfactory performance. Rubber is contained in the entire epoxy resin (containing rubber) normally by 0 to 30% by weight and preferably by 2 to 15% by weight. If the rubber content falls below 2% by weight, the final product does not show satisfactory bond strength in a humid atmosphere, whereas if the content exceeds 30% by weight, the prepared resin composition shows an irrelevantly high level of viscosity to reduce the efficiency with which the composition is screen-printed and, in some cases, degrades its bond strength after a preliminary drying process. Rubber of any of the above described types may be used alone or in combination with rubber of any other types.

A cure accelerator to be used for the purpose of the present invention is 3-phenyl-1,1-dimethylurea or 3-p-chlorophenyl-1,1-dimethylurea and expressed by general formula (3) below.

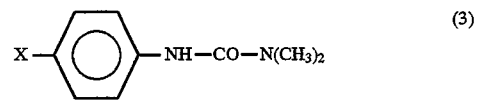
(3)

(where X is a hydrogen or chlorine atom).

For the purpose of the invention, the cure accelerator is contained in a resin composition according to the invention by 0 to 5% by weight and preferably by 0.2 to 3% by weight. If the content of the cure accelerator falls below 0.2% by weight, the composition may be cured very slowly so that enormous heat and time are consumed. If, on the other hand, the content of the cure accelerator exceeds 5% by weight, it can quickly cure the composition, but it adversely affects the moisture resistivity and the reactivity with liquid crystal of the composition.

For the purpose of the invention, any known additives may be used with a resin composition according to the invention if they do not adversely affect the effect of the composition. Additives that can be used with a resin composition according to the invention include coupling agents, solvents, thixotropic agents, pigments, dyes, plasticizers, leveling agents, defoaming agents and reactive diluents.

A typical method of manufacturing liquid crystal cells by using a resin composition according to the invention will be described below.

Cell substrates to be used with a resin composition according to the invention are made of a material selected from (1) crystalline thermoplastic resin materials such as polyethyleneterephthalate (PET), polybutyleneterephthalate (PBT), nylon (e.g., 6-6 Ny), polyacetal (POM), polyphenylenesulfide (PPS), polyetheretherketone (PEEK), liquid-crystalline polyester (LCP) and thermoplastic fluorine resin, (2) non-crystalline thermoplastic resin materials such as polycarbonate (PC), modified polyphenyleneoxide (modified PPO), polyarylate (PAR), polysulfone (PSF), polyethersulfone (PES), polyetherimide (PEI) and polyamideimide (PAI) and (3) non-thermoplastic resin materials such as polytetrafluoroethylene (PTFE), polyimide (PI), polyaminobismaleimide and triazine resin. The upper and lower substrates, are normally made of the same kind of resin materials, although they may be made of different resin materials if such materials are feasible for the operation of the produced liquid crystal cell. The surfaces of the substrates may be treated by a surface treating agent such as a silane coupling agent. Additionally, their surfaces to be used for the liquid crystal cell may be attached with the transparent electrodes and the orientation films.

A resin composition comprising epoxy resin containing a polysulfide modified epoxy resin, at least one of hydrazide compounds and at least one of fillers agents, to which a gapping agent (spacer) is added to provide a desired gap, is applied to one of cell substrates to a thickness approximately two to three times greater than the intended thickness of the composition by means of screen-printing, relief printing or a dispenser and precured in a dryer. Thereafter, another substrate to be used for the cell are bonded together and then the aggregate is heated and cured by means of a dryer, a hot plate, a heater block or an infrared heater while applying pressure to the substrates by a collet or a vacuum pin.

A precuring process to be used for the purpose of the present invention comprises steps of evaporating any solvents and moisture contained in the resin composition and subsequently carrying out a leveling operation so that the resin composition may fit well on the adhesion areas of the substrate to be bonded together. The precuring process is typically conducted in constantly flowing air at temperatures between room temperature and 130° C. for a period of time between 5 minutes and 6 hours, although it is preferably conducted at temperature between 60° and 110° C. for a period of time between 10 and 60 minutes from the viewpoint of cost effectiveness.

A hot-cure (postcure) process to be used for the purpose of the present invention is designed to cause the epoxy resin and the hydrazide compounds of a resin composition to sufficiently react with each other for curing and to bond the cell substrates together by the resin composition. The hot-cure process is typically conducted in constantly flowing air at temperature between 90° and 150° C. for a period of time between 5 and 180 minutes and preferably at temperature between 100° and 130° C. for a period of time between 30 and 120 minutes.

EXAMPLES

Now, the present invention will be described further by referring to a number of examples where a resin composition according to the invention was prepared and liquid crystal cells were prepared by using the resin composition. Note that "portion" and "%" in the following description are those expressed in terms of weight.

The prepared specimens of resin composition for sealing liquid crystal cells and those of liquid crystal panels were evaluated for the following four properties.

(1) operability: This represents an aspect of a resin composition according to the invention required to adapt itself to the entire operation of preparing a liquid crystal panel including screen printing, precuring, bonding and postcuring. The following three ratings were used.

x . . . poorly operable, Δ . . . operable but not satisfactory, o . . . excellently operable (2) bond strength: This property of each specimen was determined as follows. Each specimen was applied on a first film substrate (PET, 100 mm(width)×100 mm(length) ×0.1 mm (thickness)) by screen printing, precured at 90° C. for 20 minutes and then cooled to ambient temperature. A second film substrate (PET, 0.1 mm thick) was bonded thereto and the two substrates were pressed against each other by a press jig and postcured at 120° C. for 90 minutes. The combined substrates were then cut to produce ten 10 mm wide test pieces (100 mm(length)×10 mm(width)). The screen printing was conducted in such a way that the specimen was applied to each test pieces to occupy an area of 1 mm×50 mm with a thickness of 5 μm at the center. Immediately after preparing the test pieces and after they were immersed in boiled water for 3 to 5 hours, they are tested for T-peel test according to JIS-K-6854.

(3) flexibility: Each of the above pieces was bent and loaded with a 1 kg weight for 10 seconds to see if any breaking was observed at the bent section. If not, the piece was bent to the reverse side and subjected to a second load test. The above procedures were repeated whenever necessary. The following five ratings were used.

x . . . broken at the first test, x~Δ . . . broken at the second test, Δ . . . broken at the third test, Δ~o . . . broken at the fourth test, o . . . not broken before the fifth test (4) electric property: Immediately after preparing liquid crystal panels and after they were exposed to an atmosphere of 80° C. and 95% RH for 500 hours, an electric current was run between the terminals of each specimen to see its rate of change (coefficient).

Synthesis Example 1

A following rubber substance was synthetically prepared as an ingredient of a specimen.

Twelve portions of acrylic acid and 1 portion of triethylamine were added to a 600 portions of bisphenol F type epoxy resin prepared from bisphenol F and epichlorohydrin (EPICLON 830S: tradename, available from DAINIPPON INK AND CHEMICALS, INC.), which were then caused to react mutually by heating to 110° C. for 5 hours to produce 613 portions of epoxy resin containing acrylic group. Subsequently, 350 portions of butylacrylate, 20 portions of glycizdylmethacrylate, 1 portion of divinylbenzene, 1 portion of azobisdimethylvaleronitrile and 2 portions of azobisisobutylonitrile are added to the above product and a polymerization process was carried out on the mixture at 70° C. for 3 hours and then at 90° C. for an hour to produce a graft-polymer of epoxy resin and acrylester. Fine particles of the polymer (A-1) had an average particle size of 0.05 μm and presented a so-called sea/islands structure. The epoxy equivalent and the rubber content of the polymer were respectively 305 g/eq and 37.9%.

Synthesis Example 2

613 portions of epoxy resin containing acrylic group were prepared, following the former half procedures of Synthesis Example 1. Subsequently, 5 portions of hydroxyethylacrylate, a 10 portions of butylacrylate and 2 portions of azobisisobutylonitrile were added to the above epoxy resin and a polymerization process was carried out on the mixture at 70° C. for 3 hours and then at 90° C. for an hour to produce a graft-polymer of epoxy resin and acrylester. Then, a 70 portions of a silicone intermediate having a methoxy group in each molecule and a 300 portions of a 1:1 mixture solution of a two-liquid cold-cure type silicone rubber were added to the graft-polymer and the mixture was stirred for 3 hours for reaction to produce a silicone modified epoxy resin. Fine particles of the obtained polymer (A-2) had an average particle size of 3.5 μm and presented a so-called sea/islands structure. The epoxy equivalent and the rubber content of the polymer were respectively 281 g/eq and 33.0%.

Examples 1 through 9

The ingredients as listed in Table 1 were mixed in a Henschel or Dalton mixer or a ball mill and then kneaded in a ceramic triple-roll mixer for each example until the particles of the fillers and curing agents became smaller than 10 μm in diameter. Then, 100 portions of the kneaded material and a 3 portions of a spacer agent (milled fiber with a particle diameter of 5 μm) were mixed well at room temperature to obtain a specimen of resin composition for sealing liquid crystal cells. Each specimen was applied on e first film substrate (PET, 0.1 mm (thickness)) by screen printing, precured at 90° C. for 20 minutes and then cooled to ambient temperature. A second film substrate (PET, 0.1 mm thick) was bonded thereto and the two substrates were pressed against each other by a press jig and postcured at 120° C. for 90 minutes to produce a blank panel (liquid crystal cell). Then, biphenyl type liquid crystal was poured into the blank panel through a sealing hole, which was subsequently sealed with STRUCT BOND ES-302 (tradename: two-liquid cold-cure type epoxy resin available from MITSUI TOATSU CHEMICALS, INC.) to produce a finished film-made crystal panel.

The obtained specimens of resin composition for sealing liquid crystal cells and the liquid crystal panels were evaluated by the above described tests. Table 3 shows the results of the tests on these specimens and panels.

Comparative Examples 1 through 8

Comparative specimens of resin compositions for sealing liquid crystal cells and liquid crystal panels were prepared by using ingredients as listed in Table 2 and the process as described above for Examples 1 through 9. The obtained specimens and panels were evaluated by the above described tests. Table 3 also shows the results of the tests.

TABLE 1

| | \multicolumn{9}{c}{unit: portion Examples} |
|---|---|---|---|---|---|---|---|---|---|
| | 1 | 2 | 3 | 4 | 5 | 6 | 7 | 8 | 9 |
| epoxy resin | | | | | | | | | |
| epoxy resin A (*1) | | | | | | 80 | 40 | | |
| epoxy resin B (*2) | | | | | | | 40 | | |
| epoxy resin C (*3) | | | | | | | | | |
| epoxy resin D (*4) | | | | | | | | | |
| polysulfide modified epoxy resin | | | | | | | | | |
| A (*5) | 100 | | | 50 | | | 35 | 45 | 100 |
| B (*6) | | 100 | | | | 20 | | | |
| C (*7) | | | 100 | 50 | 20 | | 35 | 45 | |
| rubber | | | | | | | | | |
| A-1 | | | | | | | | 10 | |
| A-2 | | | | | | | 30 | | |
| average molecular weight | 720 | 660 | 1000 | 860 | 500 | 920 | 2100 | 1070 | 720 |
| curing agent | | | | | | | | | |
| DDH (*8) | 14 | 16 | 10 | 12 | 24 | 16 | 14 | 13 | 14 |
| PAA (*9) | | | | | | | | | |
| polythiol (*10) | | | | | | | | | |
| cure accelerator | | | | | | | | | |
| A (*11) | 2 | 2 | 2 | 2 | 2 | 2 | 2 | 2 | |
| B (*12) | | | | | | | | | 2 |
| filler | | | | | | | | | |
| alumina | 10 | 10 | 10 | 10 | 10 | 10 | 10 | 10 | 10 |
| thixotropic agent | | | | | | | | | |
| AEROSIL (*13) | 5 | 5 | 5 | 5 | 5 | 5 | 5 | 5 | 5 |

TABLE 2

| | \multicolumn{8}{c}{unit: portion Comparative Examples} |
|---|---|---|---|---|---|---|---|---|
| | 1 | 2 | 3 | 4 | 5 | 6 | 7 | 8 |
| epoxy resin | | | | | | | | |
| epoxy resin A (*1) | 85 | | | | | | 85 | 85 |
| epoxy resin B (*2) | | | | | | | | |
| epoxy resin C (*3) | | 85 | | | | | | |
| epoxy resin D (*4) | | | 85 | 100 | 70 | 55 | | |
| polysulfide modified epoxy resin | | | | | | | | |
| A (*5) | 15 | | | | | | | |
| B (*6) | | | | | | | | |

TABLE 2-continued

| | unit: portion Comparative Examples | | | | | | | |
|---|---|---|---|---|---|---|---|---|
| | 1 | 2 | 3 | 4 | 5 | 6 | 7 | 8 |
| C (*7) rubber | 15 | | 15 | | | 15 | 15 | 15 |
| A-1 | | | | | 30 | 30 | | |
| A-2 | | | | | | | | |
| average molecular weight curing agent | 470 | 660 | 580 | 500 | 1250 | 1330 | 470 | 470 |
| DDH (*8) | 25 | 16 | 25 | 17 | 17 | 16 | | |
| PAA (*9) | | | | | | | 117 | |
| polythiol (*10) | | | | | | | | 214 |
| cure accelerator | | | | | | | | |
| A (*11) | 2 | 2 | 2 | 2 | 2 | 2 | | |
| B (*12) | | | | | | | | |
| filler | | | | | | | | |
| alumina thixotropic agent | 10 | 10 | 10 | 10 | 10 | 10 | 10 | 10 |
| AEROSIL (*13) | 5 | 5 | 5 | 5 | 5 | 5 | 5 | 5 |

*1: bisphenol F/epichlorohydrin polycondensation type epoxy resin tradename: EPICLON 830S, available from DAINIPPON INK AND CHEMICALS, INC. average molecular weight 380 epoxy equivalent 185–195 g/eq
*2: bisphenol A/epichlorohydrin polycondensation type epoxy resin tradename: Epikote 1004, available from Yuka Shell Epoxy Co., Ltd. average molecular weight 1,600 epoxy equivalent 875–975 g/eq
*3: chain epoxy resin tradename: Adeka Resin EP-4000, available from ASAHI DENKA KOGYO K.K. average molecular weight 650 epoxy equivalent 310–340 g/eq
*4: urethane modified epoxy resin tradename: Adeka Resin EPU-11, available from ASAHI DENKA KOGYO K.K. average molecular weight 500 epoxy equivalent 285–335 g/eq
*5: polysulfide modified epoxy resin, FLEP-10 available from Toray Thiokol Co., Ltd. average molecular weight 720 epoxy equivalent 330–390 g/eq
*6: polysulfide modified epoxy resin, FLEP-50 available from Toray Thiokol Co., Ltd. average molecular weight 660 epoxy equivalent 300–360 g/eq
*7: polysulfide modified epoxy resin, FLEP-80 available from Toray Thiokol Co., Ltd. average molecular weight 1,000 epoxy equivalent 450–550 g/eq
*8: dodecanoic diacid dihydrazide
*9: polyamideamine tradename: Versamid 125 available from Henkel Hakusui Corp. amine value 330–360 mg-KOH/g
*10: polythiol (mercaptan) tradename: ATO CX-1, ATOCHEM JAPAN SH value 6.70 mg-KOH/g
*11: 3-p-chlorophenyl-1,1-dimethylurea available from Tokyo Kasei Kogyo Co., Ltd.
*12: 3-phenyl-1,1-dimethylurea available from ACI Japan Ltd.
*13: AEROSIL #200 (tradename), available from Nippon Aerosil Co., Ltd.

TABLE 3

| | opera- bility | bond strength (kg/10 mm) | | | flexi- bility | electric property (coeffi- cient) |
|---|---|---|---|---|---|---|
| | | 0 hrs | 3 hrs | 5 hrs | | |
| Example | | | | | | |
| 1 | o | 2.4 | 2.4 | 2.2 | o | 1.72 |
| 2 | o | 2.2 | 2.1 | 1.6 | o | 1.82 |
| 3 | o | 2.3 | 2.0 | 1.5 | o | 1.91 |
| 4 | o | 2.9 | 2.7 | 2.7 | o | 1.78 |
| 5 | Δ | 1.4 | 1.3 | 1.2 | Δ~o | 2.23 |
| 6 | Δ | 1.2 | 1.3 | 1.1 | Δ~o | 2.19 |
| 7 | o | 3.7 | 3.4 | 3.1 | o | 1.58 |
| 8 | o | 3.1 | 3.0 | 2.6 | o | 1.64 |
| 9 | o | 2.5 | 2.3 | 2.2 | o | 1.83 |
| Comparative Example | | | | | | |
| 1 | o | 0.8 | 0.5 | 0 | x–Δ | — |
| 2 | o | 0.7 | 0.6 | 0.2 | x | — |
| 3 | o | 0.4 | 0.2 | 0 | x | — |
| 4 | Δ | 0.1 | 0 | 0 | x | — |
| 5 | o | 0.5 | 0.3 | 0.3 | x | 5.89 |
| 6 | o | 0.3 | 1.2 | 1.0 | x–Δ | 3.65 |
| 7 | x | 0.3 | 0 | 0 | x | — |
| 8 | x | 0.4 | 0 | 0 | x | — |

B.N.: "—" denotes that the test was impossible due to breaking after holding for 500 hours in atmosphere of 80° C. and 95% RH.

What is claimed is:

1. A liquid crystal cell prepared by applying a resin composition for sealing liquid crystal cells to a cell substrate made of a plastic film, said resin composition comprising an epoxy resin containing a polysulfide modified epoxy resin, a hydrazide compound and filler, wherein the epoxy resin contains said polysulfide modified epoxy resin in an amount of 20 to 100% by weight and said polysulfide modified epoxy resin is expressed by general formula (1):

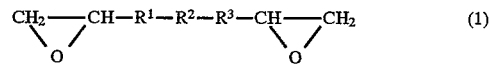

wherein each of $R^1$ and $R^3$ represents at least one organic group selected from the group consisting of bisphenol structures, aliphatic oxyether structures and aliphatic thioester structures and $R^2$ represents a polysulfide structure expressed by $-(C_2H_4OCH_2OC_2H_4S_m)_n-$, where m represents the number of sulfur atoms contained in a polysulfide structure and is 1 or 2, and n represents the average number of polysulfide structures contained in the above formula and is 1 to 50, precuring the resin composition and thereafter hot-curing the resin composition to bond the substrate.

2. The liquid crystal cell of claim 1 wherein the epoxy resin contains rubber which is graft-copolymerized with the epoxy resin.

3. The liquid crystal cell of claim 2 wherein fine particles of an acrylester rubber, a silicone rubber, a conjugated diene rubber or a mixture thereof having a particle size of 0.01 to 5 μm are dispersed in the epoxy resin.

4. The liquid crystal cell of claim 2 wherein the rubber is present in an amount of 2 to 30% by weight.

5. The liquid crystal cell of claim 3 wherein the rubber is present in an amount of 2 to 30% by weight.

6. The liquid crystal cell of claim 1 wherein the composition further comprises a cure accelerator that is a urea compound.

7. The liquid crystal cell of claim 6 wherein the cure accelerator is expressed by general formula (3):
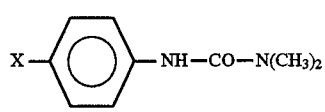 (3)
where X is a hydrogen or chlorine atom.
8. The liquid crystal cell of claim 7 wherein the urea compound is present in an amount of 0.2 to 5% by weight.
* * * * *